United States Patent [19]
Miyake et al.

[11] 4,349,091
[45] Sep. 14, 1982

[54] SYNCHRONIZED DOG CLUTCH

[75] Inventors: Hajime Miyake, Nagaokakyo; Osamu Matsumoto; Fumio Dohi, both of Kyoto, all of Japan

[73] Assignee: Yanmar Diesel Engine Co., Ltd., Japan

[21] Appl. No.: 206,075

[22] Filed: Nov. 12, 1980

[51] Int. Cl.$^3$ .................. F16D 23/04; F16D 21/04
[52] U.S. Cl. ............................ 192/53 F; 74/339; 192/21
[58] Field of Search ............... 192/21, 53 F, 53 E; 74/339

[56] References Cited
U.S. PATENT DOCUMENTS

| | | | |
|---|---|---|---|
| 2,113,709 | 4/1938 | Peterson | 192/53 F |
| 2,238,370 | 4/1941 | Peterson | 192/53 E X |
| 2,256,320 | 9/1941 | Lapsley | 192/53 F |
| 2,369,842 | 2/1945 | Neracher et al. | 192/53 F |

*Primary Examiner*—Allan D. Herrmann
*Attorney, Agent, or Firm*—Burns, Doane, Swecker & Mathis

[57] ABSTRACT

A synchronized dog clutch according to the invention comprises a clutch shaft, a coupling sleeve splined to the clutch shaft and having dog claws at its end, a synchronizer ring slidably fitted to outer periphery of the coupling sleeve, said synchronizer ring having a conical face for frictional engagement and being rotatable together with the coupling sleeve, and a gear wheel coaxially and rotatably arranged with respect to the clutch shaft and having teeth at its outer periphery. The gear wheel is provided with a conical face and claws respectively engagable with the conical face of the synchronizer ring and the claws of the coupling sleeve. The conical face of the gear wheel is disposed closely and radially inside the teeth, and the claws of the gear wheel are arranged inside the conical face, and thereby torque transmitted through the conical faces for synchronization is increased.

4 Claims, 11 Drawing Figures

SYNCHRONIZED DOG CLUTCH

BACKGROUND AND SUMMARY OF THE PRESENT INVENTION

This invention relates to a synchronized dog clutch applicable to inboard-outboard stern drive marine propulsion units or other power transmission mechanisms, and particularly to synchronized dog clutches wherein power is transmitted between a gear wheel and a clutch shaft by a coupling sleeve and a synchronizer ring.

Conventionally, a clutch of the type mentioned above comprises, as shown in FIG. 1 a clutch shaft 1 (input shaft or output shaft), a cylindrical synchronizer ring 2 splined to the shaft 1, and a coupling sleeve 3 splined to the outer periphery of the ring 2. The synchronizer ring 2 is provided with a conical face 5 for frictional engagement at an outer periphery of its end. The coupling sleeve 3 is provided with claws 6 at the end. A bevel gear wheel 7 is coaxially and rotatably arranged around the clutch shaft 1, and is provided with claws 8 and a conical face 10. The claws 8 are meshable with the claws 6, and the face 10 is frictionally engagable with the face 5.

In the engagement operation the coupling sleeve 3 is shifted toward the gear wheel 7 by a shift mechanism (not shown). Initially the synchronizer ring 2 is shifted together with the coupling sleeve 3 by a detent mechanism 11, and the conical face 5 is first pressed against the conical face 10, whereby the rotation of the shaft 1, the ring 2 and the sleeve 3 is sychronized with that of the gear wheel 7. After the synchronization, the detent mechanism 11 yields, the sleeve 3 is further shifted on the ring 2, and both claws 6 and 8 are meshed with each other. When they are meshed, since the rotation of the claws 6 and 8 is synchronized, shock is not generated. However in the clutch stated above, since the conical face 10 is formed at the inner portion of the gear wheel 7, the effective radius of the face 10 is short. Therefore, in order to transmit sufficient torque through the face 10 for synchronization, it is necessary to employ the big gear wheel 7 and the ring 2, and also to employ the detent mechanism 11 having a strong detent force (corresponding to the pressure force between the faces 5 and 10), which increases the size and cost of the clutch, and also increases the force required for clutch operation. Further, in the above-stated clutch, the following disadvantage may result. Namely, if the friction force between the sleeve 3 and the ring 2 is larger than that between the ring 2 and the shaft 1, since the sleeve 3 may return to the neutral position without sliding on the ring 2 in the release operation, the ring 2 is fixedly held and returned by the sleeve 3 to a position which is remote from the neutral position in the opposite direction to the gear wheel 7, whereby the intended operation of the ring 2 is not obtained in the next engagement operation. In other words, both claws 6 and 8 are meshed with each other before the face 5 touches the face 10 in the next operation, and thereby the undesired shock is generated.

Accordingly, it is an object of the invention to provide an improved synchronized dog clutch, wherein a gear wheel having teeth at its outer periphery is provided both with a conical face for frictional engagement lying closely and radially inside the outer teeth, and with claws lying radially inside the conical face, whereby the effective radius of the conical face is increased, the torque for synchronization is increased, and thereby a compact and easily operated clutch is obtained.

Another object of the invention is to provide an improved mechanism for obtaining an exact shift of a synchronizer ring and a coupling sleeve relative to each other without fail.

Other and further objects, features and advantages of the invention will appear more fully from the following description of the preferred embodiments of the invention.

BRIEF DESCRIPTION OF THE DRAWINGS

The preferred embodiments will be described with reference to the accompanying drawings wherein like members bear like reference numbers.

DETAILED DESCRIPTION OF THE PREFERRED EMBODIMENTS

Figure 1:
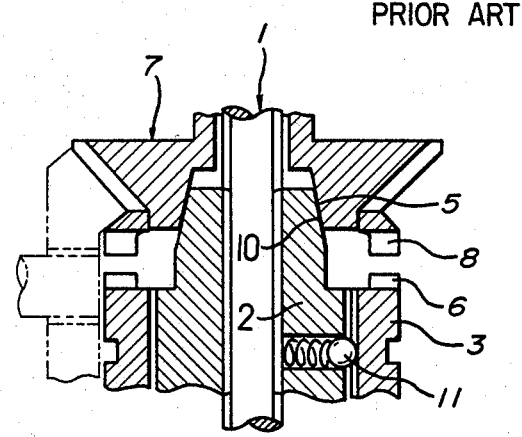
FIG. 1 is a schematic sectional fragmentary view of a synchronized dog clutch according to the prior art.
Figure 2:
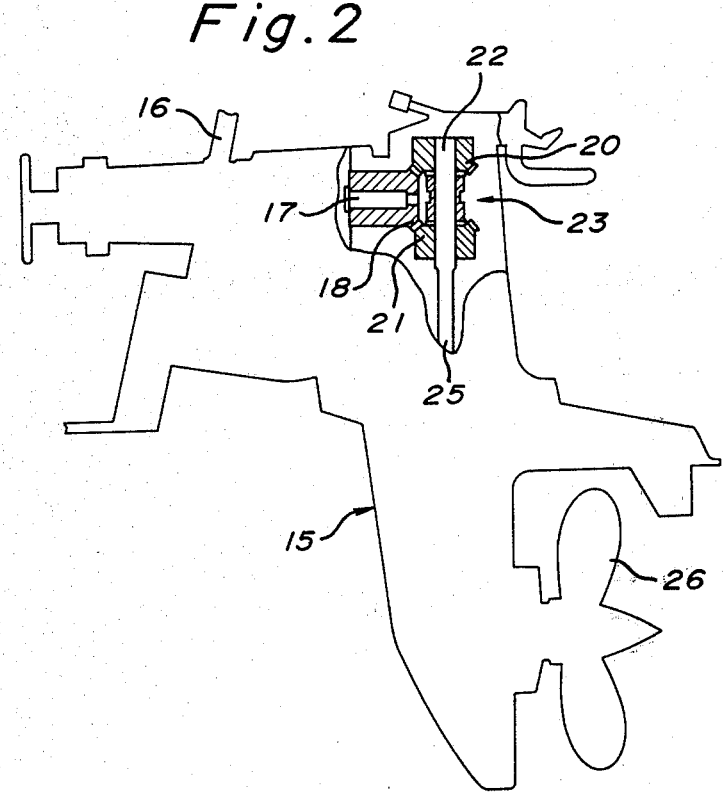
FIG. 2 is a partially cut-away schematic side view showing an outboard drive unit including a synchronized dog clutch according to the invention.

Referring to FIG. 2, an outboard drive unit 15 of an inboard-outboard stern drive marine propulsion units includes an upper portion supported on a transom 16. An input shaft 17 extends substantially horizontally from an inboard engine (not shown) into the unit 15. A bevel gear wheel 18 is fixed to the rear end of the shaft 17. Both an upper portion and a lower portion of the gear wheel 18 are constantly in mesh with a forward drive gear wheel 20 and a backward drive gear wheel 21 respectively. Both gear wheels 20 and 21 are rotatably arranged around a substantially vertical clutch shaft 22. A clutch mechanism 23, hereinafter described in detail, is employed for alternatively engaging the clutch shaft 22 to one of the gear wheels 20 and 21. A lower end of the shaft 22 is connected to a substantially vertical drive shaft 25. A lower end of the shaft 25 is connected to a front end of a horizontal shaft (not shown) of a propellor 26 by way of bevel gear wheels (not shown).

Figure 3:
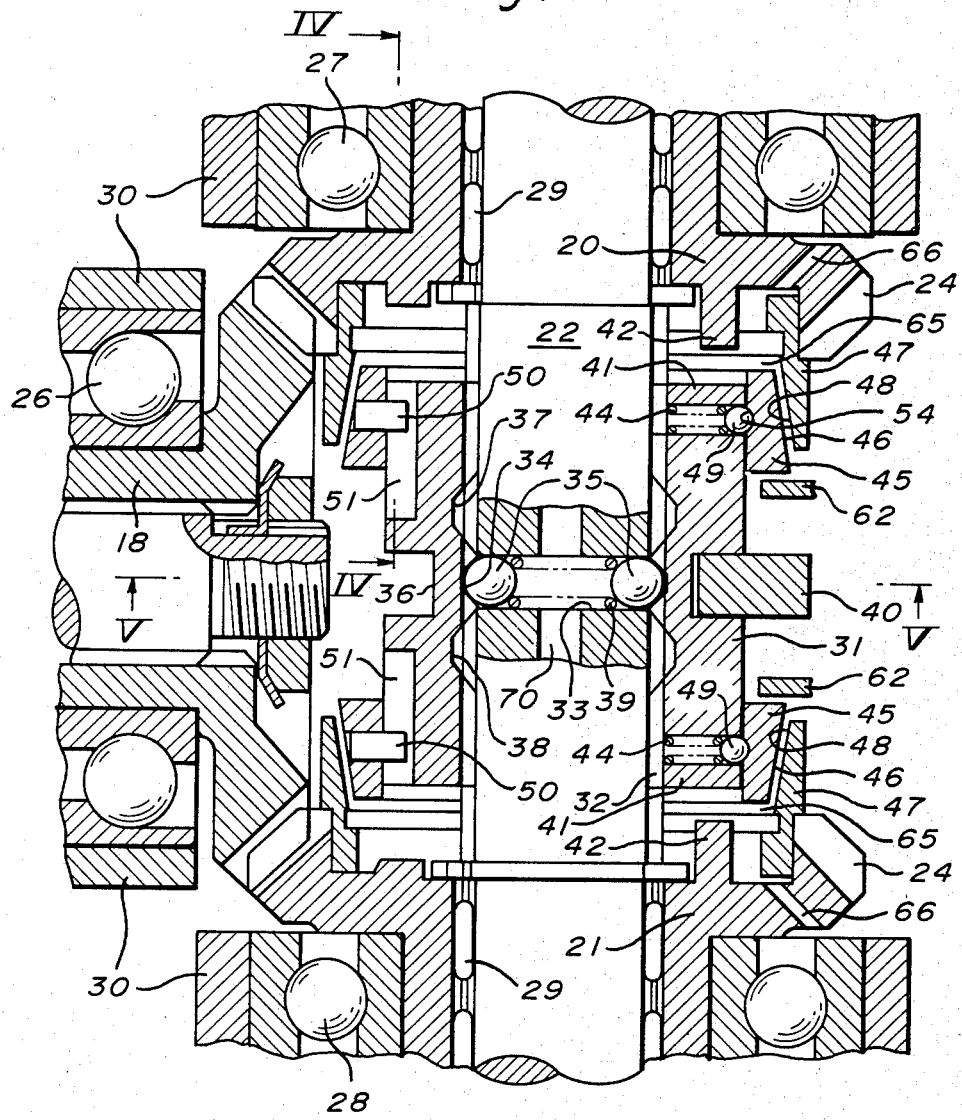
FIG. 3 is an enlarged detailed fragmentary view of FIG. 2.

As shown in FIG. 3, bosses of the gear wheels 18, 20 and 21 are supported by a housing or frame 30 by bearings 26, 27, 28 respectively. The clutch shaft 22 is rotatably and coaxially supported by the gear wheels 20 and 21 by bearings 29. A coupling sleeve 31 is slidably splined to the outer periphery of the shaft 22 between the gear wheels 20 and 21 by splines 32. The shaft 22 is provided with a diametrically extending aperture 33 at an intermediate portion. Two detent balls 35, and a compression coil spring 39 provided therebetween are disposed in the aperture 33. The coupling sleeve 31 is provided with these axially spaced circular grooves 37, 34 and 38 at its inner periphery. In the neutral position shown in FIG. 3, each ball 35 is engaged in the intermediate groove 34. The sleeve 31 is provided at its outer peripheral portion with a circular groove 36, into which a fork 40 of a shift mechanism (described in detail below) is enaged.

Dog claws 41 are formed at both end faces of the coupling sleeve 31. The dog claws 42 facing the claws 41 are formed at end or side faces of the gear wheels 20 and 21. Inner peripheries of two synchronizer rings 45 are rotatably fitted respectively to both ends of the outer periphery of the sleeve 31. Each ring 45 is provided with a conical face 46 for frictional engagement at its outer periphery. The face 46 has a smaller diameter at its end adjacent to the gear wheel 20 or 21 than that at the opposite end. A cylindrical member 47 is arranged around each ring 45. Each member 47 is fixed at one end to the inner periphery of the rim of the gear wheel 20 or 21, and is provided with a conical face 48 for frictional engagement at the inner periphery of the end projected from the rim. Each face 48 has the same shape as the face 45 adjacent thereto.

The coupling sleeve 31 is provided with apertures inside the rings 45. A compression coil spring 44 and a detent ball 49 are disposed in each aperture. In the neutral position shown in FIG. 3, each detent ball 49 is engaged into a circular groove 54 formed at the inner periphery of the ring 45.

Figure 4:
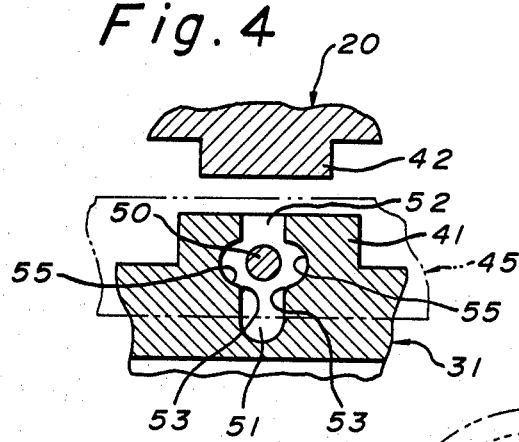
FIG. 4 is a sectional fragmentary view taken along line IV—IV of FIG. 3.

Several or at least one pin 50 is fixed to each ring 45. Each pin 50 projects inwardly along the radius of the ring 45 and enters a groove 51 formed at the outer periphery of the sleeve 31, in other words, at the surface facing the ring 45. As shown in FIG. 4, the groove 51 extends substantially vertically or lengthwisely of the shaft 22 shown in FIG. 3. One end 52 of the groove 51 facing the claws 42 is open, and the other end is closed. Hollow portions 55 (See FIG. 4) are formed at both side edges of the groove 51 with round chamfers 53 provided therebetween. Each hollow portion 55 is located near the open end 52 and facing the pin 50 in the neutral position shown in FIG. 4.

Figure 5:
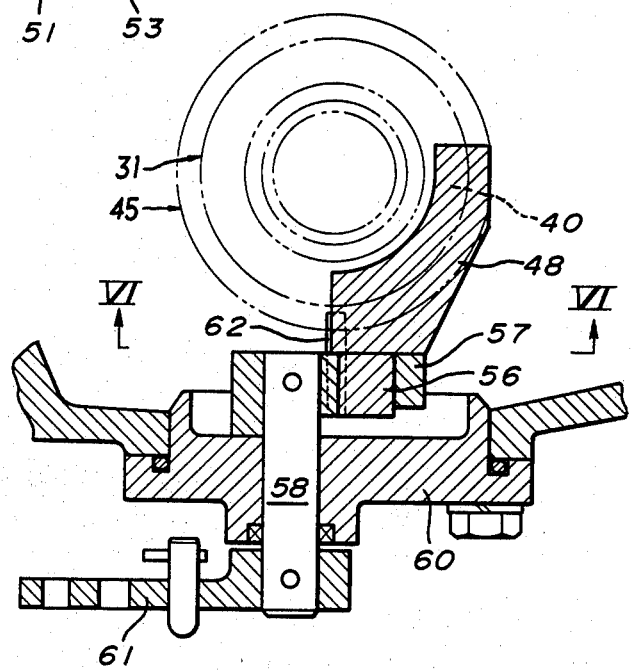
FIG. 5 is a fragmentary sectional view taken along line V—V of FIG. 3.
Figure 6:
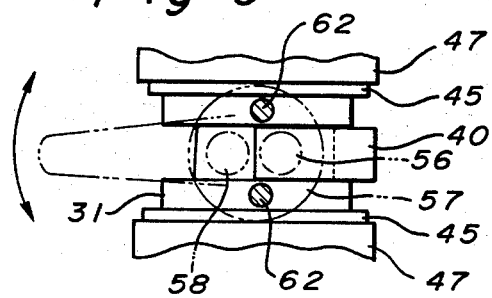
FIG. 6 is a sectional fragmentary view taken along line VI—VI of FIG. 5.

As shown in FIG. 5, a shaft portion of the shift fork 40 is rotatably supported in an aperture of a circular plate 57, which is fixed to one end of a shift lever shaft 58 extending parallel to the shaft portion 56. The intermediate portion of the shaft 58 is supported by a housing or frame 60, and the other end thereof is connected to the lever 61. As shown in FIG. 6, two stopper members 62 are fixed to the plate 57. Each member 62 is formed by the pin parallel to the shaft 58, and as shown in FIG. 3, is faced and adjacent to the end face of the ring 45 faced to the fork 40.

A space 65 is formed between the clutch shaft 22 and each cylindrical member 47, and both ends of each space 65 are closed by the gear wheel 20 or 21, and the sleeve 31 as well as the ring 45. Each of the gear wheels 20 and 21 is provided with a pressure releasing conduit 66, through which the space 65 is connected to an outer space.

In operation, when the fork 40 is moved upwardly (in the engaging direction) from the neutral position shown in FIG. 3, the sleeve 31 pushes down the balls 35, and slides toward the gear wheel 20. Initially, in that sliding operation, the synchronizer rings 45 are moved upwardly together with the coupling sleeve 31 by the detent balls 49, and the face 46 of the ring 45 adjacent to the gear wheel 20 is pressed and frictionally engaged to the face 48. By that engagement, the member 47 starts to drag and rotate the ring 45 by the friction between the faces 46 and 48. In that rotation, the ring 45 rotates on the sleeve 31 in a few degrees until the pin 50 shown in FIG. 4 is moved and fitted into one of the hollow portions 55. After the pin 50 is fitted into the portion 55, the ring 45 rotates together with the sleeve 31 as well as the clutch shaft 22 in FIG. 3. Initially, the face 46 slips on the face 48, and the degree of the slip is gradually reduced, therefore the rotation speed of the ring 45 is gradually increased. While the ring 45 is accelerated, the pin 50 is pressed to the edge of the hollow portion 55 with force corresponding to that acceleration, whereby the sleeve 31 is prevented from sliding relatively upwardly with respect to the pin 50 and ring 45.

Therefore the upper claws 41 do not mesh with the claws 42 of the gear wheel 20, while the face 46 slips on the face 48, in other words, until the rotation of the ring 45 and sleeve 31 is synchronized with that of the gear wheel 20. After the synchronization is completed, the ring 45 is not accelerated any more. Therefore the pin 50 is no longer pressed against the hollow portion 55 (FIG. 4), and passes relatively over the chamfer 53. The sleeve 31 yields the spring 44 and the ball 49 shown in FIG. 3, and slides further in the engaging direction (upwardly), thereby both of the claws 41 and 42 mesh with each other.

In the above described operation, it is necessary to transmit a large torque between the faces 46 and 48 so that the ring 45 and the sleeve 31 may be quickly and precisely synchronized. And, in the present invention, since the face 48 is arranged in the outer position closely and radially of the teeth 24 on the outer periphery of the gear wheel 20, the effective radius of the face 48 is long. Therefore sufficient torque can be transmitted through the engaged faces 46 and 48 with only light pressure, which reduces the force required for operating the fork 40, and achieves the light operation of the clutch. Further, as the detent force required for the detent ball 49 is light, the small ball 49 and the small spring 44 can be employed. When the sleeve 31 is shifted relatively to the ring 45, since the detent force by the ball 49 is light, the sleeve 31 can be shifted by only a light operating force, which also achieves the light operation of the clutch.

When the sleeve 31 slides as stated above, the capacity of the upper space 65 is gradually reduced. However, some of the air in the space 65 flows out through the pressure releasing conduit 66, and the air in the space 65 is not compressed. Therefore the sleeve 31 can lightly slide without receiving a resistive force from the air in the space 65.

In the forward drive position in which the claws 41 mesh with the claws 42 of the forward drive gear wheel 21, the balls 35 are fitted into the lower groove 38. When the fork 40 is downwardly shifted from the forward drive position, the sleeve 31 returns to the neutral position shown in FIG. 3, and the claws 41 are released from the claws 42. In this releasing operation, the sleeve 31 initially slides downwardly with respect to the upper ring 45 until the ball 49 is fitted into the groove 54, and then the sleeve 31 returns downwardly together with the ring 45. In such operation, if the frictional force between the sleeve 31 and the upper ring 45 is large, the ring 45 may move together with the sleeve 31 from the start of the releasing operation, and return to the neutral position with respect to the clutch shaft 22 before the sleeve 31 returns to the neutral position. However, before the ring 45 passes downwardly of the neutral position, the ring 45 comes in contact with the upper stopper member 62, and is located at the neutral position by the member 62. In the releasing operation from the engaged position stated hereinbefore, the capacity of the upper space 65 gradually increases. However, as the air flows into the space 65 through the conduit 66, the pressure of the space 65 does not decrease. Therefore, the sleeve 31 does not receive a resistive force from the space 65.

When the coupling sleeve 31 is shifted downwardly from the neutral position, each member and portion operate similarly, and the shaft 22 is engaged with the backward drive gear wheel 21. In the releasing operation from the gear wheel 21, each member and portion operate similarly.

According to the present invention, as stated above, since the effective radius of each of the gear wheels 20 and 21 is increased and approaches the outer radius of the gear wheel 20 or 21, it is possible to make the whole structure compact and to reduce the necessary operation force. In the embodiment shown in FIG. 3, wherein the pin 50 and groove 51 are employed for each ring 45, it is possible to precisely locate the ring 45 and to always obtain a predetermined synchronizing operation without fail. Further in the above embodiment, it is not necessary to provide splines at the inner periphery of the ring 45 and the outer periphery of the coupling sleeve 31, therefore the machining cost can be reduced. When the stopper member 62 and the pressure releasing conduit 66 are employed, it is possible to obtain a more precisely predetermined operation of the ring 45 and sleeve 31.

Following is a description of structure which can be employed as a modified embodiment of the invention.

The pin 50 may be fixed to the coupling sleeve 31, and the groove 51 may be formed at the inner periphery of the ring 45.

The conduit 66 may be formed in the member 47, the ring 45 or the sleeve 31. Only one of the spaces 65 may be connected to the outer space by the conduit, and in that case said one space 65 is connected to the other space 65 through a passage formed between the splines of the shaft 22 and sleeve 31. The shaft 22 may be provided with conduits, through which each space 65 is connected to a passage 70 (see FIG. 3) of lubricating oil formed in the shaft 22.

Each member 47 having the conical face 48 may be formed in one body with the corresponding gear wheel 20 or 21.

Figure 3A:
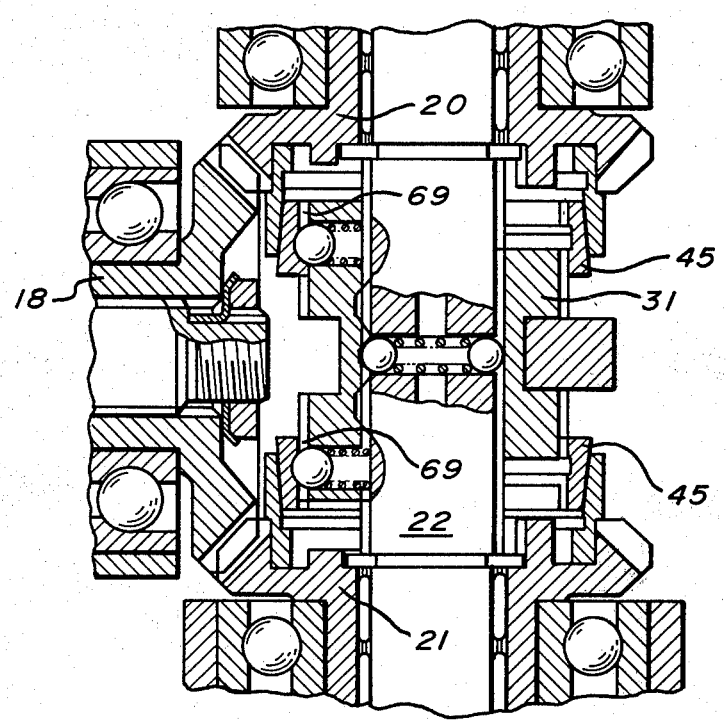
FIG. 3a is a sectional view of another embodiment of a synchronized dog clutch according to the present invention corresponding to FIG. 3.

The pin 50, groove 51, member 62, and conduit 66 may be eliminated as shown in FIG. 3a, and each ring 45 may be fitted to the sleeve 31 by splines 69.

Figure 7:
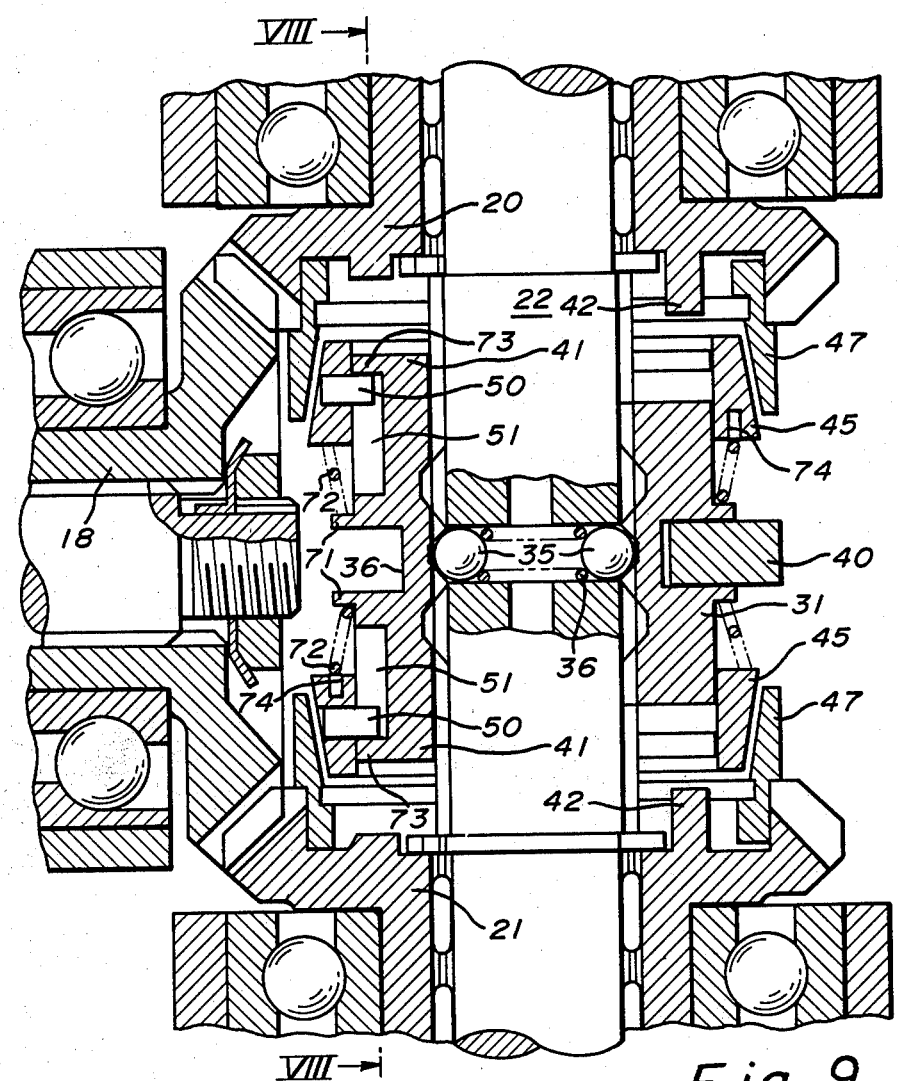
FIG. 7 and FIG. 8 are views of still another embodiment corresponding to FIG. 3 and FIG. 4 respectively.
Figure 8:
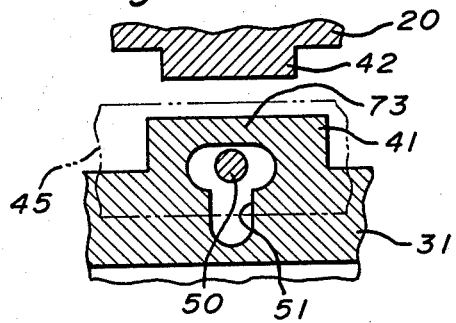
Figure 9:
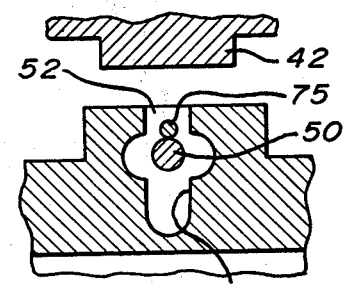
FIG. 9 is a view of a further embodiment corresponding to FIG. 8.

With reference now to FIG. 7, the sleeve 31 is provided with two spring seats 71 formed by outwardly extending circular flanges at both side edges of the circular groove 36 into which the fork 40 is fitted. A compression coil spring 72, or plural belleville springs or the like, is arranged between each spring seat 71 and associated synchronizer ring 45. As shown in FIG. 8, which is a sectional fragmentary view taken along line VIII—VIII in FIG. 7, each groove 51 which the pin 50 enters is closed at the upper and lower ends. Accordingly to this structure, the elastic force of each spring 72 prevents the corresponding ring 45 from over-returning toward the circular groove 36. A closed portion 73 (which stops the pin 50) is formed at the end of each groove 51 opposite to the groove 36, and prevents the ring 45 from over-sliding toward the claws 42 adjacent thereto. Therefore the synchronizer ring 45 is always positioned at the neutral position while the clutch is released. Further, since the positioning of the ring 45 is achieved in this manner, it is not necessary to employ a detent mechanism between the ring 45 and the sleeve 31, and also it is not necessary to employ the stopper member 62 as shown in FIG. 3. Although the clutch in FIG. 7 is not provided with a pressure releasing conduit, such conduit may be employed. Instead of the closed portions 73 in FIGS. 7 and 8, the structure shown in FIG. 9 may be employed. In FIG. 9, the groove 51 is provide with an open end 52 adjacent to the claws 42, and a pin 75 (which stops the pin 50) is fixed at the end 52. The pin 50 is prevented from passing through the open end 52 by the pin 75.

Figure 10:
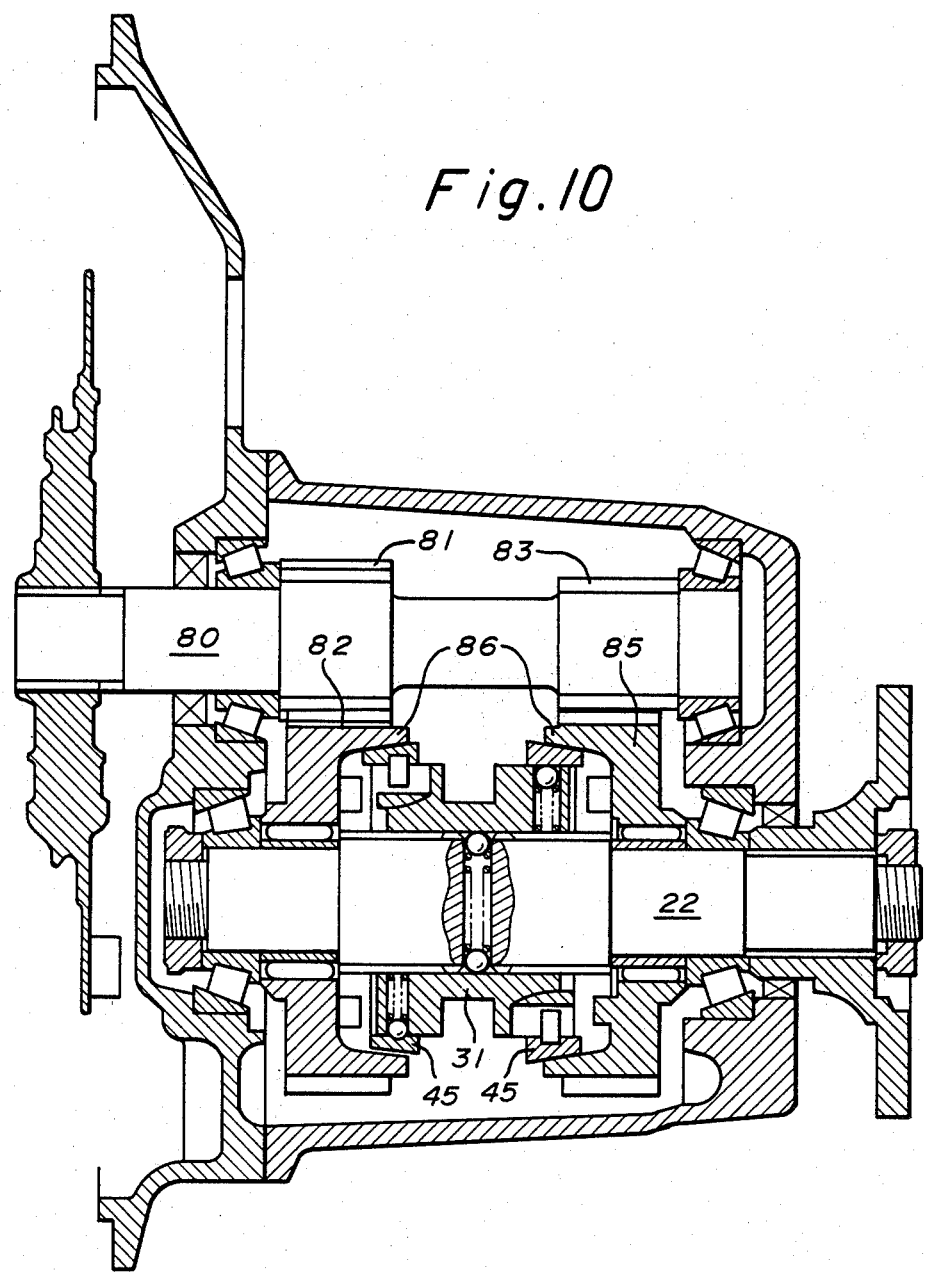
FIG. 10 is a sectional view of still another embodiment.

The present invention may be employed in such power transmission mechanism as shown in FIG. 10. Referring to FIG. 10, an input shaft 80 is parallel to the clutch shaft 22. A forward drive spur gear wheel 81 on the shaft 80 directly meshes with a spur gear wheel 82 on the shaft 22. A backward drive spur gear wheel 83 on the shaft 80 meshes with a spur gear wheel 85 on the shaft 22 by way of a counter gear wheel (not shown). The sleeve 31 is splined to the portion on the shaft 22 axially between the gear wheels 82 and 85. The synchronizer rings 45 are rotatably fitted to the outer periphery of the sleeve 31. Each of the gear wheels 82 and 85 is provided with a cylindrical portion 86 formed in one body. Each portion 86 has at its inner periphery a conical face faced to the conical face of each ring 45. Although the clutch in FIG. 10 is not provided with the stopper members 62 and pressure releasing conduits 66 shown in FIG. 3, those members and conduits may be employed in the clutch of FIG. 10.

The present invention may be employed in the clutch, wherein the power is transmitted from the clutch shaft 22 to the gear wheels, and also in the clutch, wherein only one gear wheel is employed.

Although the invention has been described in its preferred form with a certain degree of particularity, it is understood that the present disclosure of the preferred form may be changed in the details of construction and the combination and arrangement of parts may be varied without departing from the spirit and the scope of the invention as hereinafter claimed.

What is claimed is:

1. A synchronized dog clutch comprising:

a clutch shaft;

a coupling sleeve slidably arranged on the clutch shaft and having claws at one end;

a synchronizer ring arranged on the clutch shaft having a conical face for frictional engagement at an outer periphery, said coupling sleeve and said synchronizer ring being individually slidable with respect to the clutch shaft and rotatable together with the clutch shaft;

a gear wheel coaxially and rotatably arranged with respect to the clutch shaft and having teeth at an outer periphery, said gear wheel being provided with claws and a conical face respectively engagable with said claws and said conical face;

said coupling sleeve being arranged for said sliding movement on the clutch shaft together with the synchronizer ring, with the conical face of the synchronizer ring being first engaged with the conical face of the gear wheel before said engagement of the claws; said coupling sleeve being splined to the outer periphery of the clutch shaft and said synchronizer ring being fitted to the outer periphery of the coupling sleeve and with the conical face of the gear wheel disposed closely and radially inside the outer teeth, and with the claws of the gear wheel disposed radially inside the conical face, wherein a groove extending lengthwisely of the clutch shaft is formed at one of the faced peripheral surfaces of the coupling sleeve and the synchronizer ring, and wherein a pin entering said groove projects from the other one of said surfaces, said groove having a hollow portion on the side edge thereof with a round chamfer therebetween, and wherein the coupling sleeve is fitted to the synchronizer ring so that the pin may travel within the groove along the circumference of said surfaces; the pin being pressed to the edge of the hollow portion, when the rotation of the synchronizer ring is not synchronized with that of the gear wheels, so that the coupling sleeve is prevented from sliding axially relatively with respect to the synchronizer ring until synchronization is achieved.

2. The synchronized dog clutch of claim 1, wherein a stopper member is arranged rearward of and close to, in the engaging direction, the synchronizer ring whereby in a releasing operation, the synchronizer ring is prevented from passing the neutral position in the releasing direction.

3. The synchronized dog clutch of claim 1, wherein the synchronizer ring is provided with said pin, the coupling sleeve is provided with said groove and with stopper means for preventing the pin from sliding in the engaging direction from the neutral position with respect to the groove; and spring means is arranged between the coupling sleeve and the synchronizer ring for urging the synchronizer ring in the engaging direction.

4. The synchronized dog clutch of claim 1, 2 or 3, wherein a pressure releasing conduit is connected to a space formed between the synchronizer ring, the coupling sleeve, and the gear wheel.

* * * * *